(12) United States Patent
Jitaru et al.

(10) Patent No.: US 12,322,535 B2
(45) Date of Patent: Jun. 3, 2025

(54) PLANAR MULTILAYER TRANSFORMER WITH MINIMUM NOISE INJECTION IN BETWEEN PRIMARY AND SECONDARY WINDING

(71) Applicant: Rompower Technology Holdings, LLC, Milford, DE (US)

(72) Inventors: Ionel Jitaru, Tucson, AZ (US); Mihai Bogdan Jitariu, Neamt (RO)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

(21) Appl. No.: 18/986,636

(22) Filed: Dec. 18, 2024

(65) Prior Publication Data
US 2025/0125079 A1    Apr. 17, 2025

Related U.S. Application Data

(63) Continuation-in-part of application No. 18/596,383, filed on Mar. 5, 2024, which is a continuation of application No. 17/948,966, filed on Sep. 20, 2022, now Pat. No. 11,929,198, which is a continuation of application No. 17/524,495, filed on Nov. 11, 2021, now Pat. No. 11,450,470.

(60) Provisional application No. 63/112,564, filed on Nov. 11, 2020.

(51) Int. Cl.
*H02M 3/335* (2006.01)
*H01F 27/24* (2006.01)
*H01F 27/28* (2006.01)
*H01F 27/34* (2006.01)
*H02M 1/44* (2007.01)

(52) U.S. Cl.
CPC ............. *H01F 27/28* (2013.01); *H01F 27/24* (2013.01); *H01F 27/346* (2013.01); *H02M 1/44* (2013.01); *H02M 3/335* (2013.01)

(58) Field of Classification Search
CPC ........ H01F 27/28; H01F 27/24; H01F 27/346; H02M 1/44; H02M 3/335
See application file for complete search history.

(56) References Cited

U.S. PATENT DOCUMENTS

| | | |
|---|---|---|
| 5,107,411 A | 4/1992 | Misdom |
| 5,724,236 A | 3/1998 | Oglesbee |
| 5,990,776 A | 11/1999 | Jitaru |
| 6,466,454 B1 | 10/2002 | Jitaru |
| 6,490,181 B1 | 12/2002 | Liu et al. |
| 6,549,431 B2 | 4/2003 | Odell et al. |
| 7,868,724 B2 | 1/2011 | Sicong et al. |

(Continued)

FOREIGN PATENT DOCUMENTS

CN        104425117        3/2015

*Primary Examiner* — Adolf D Berhane
(74) *Attorney, Agent, or Firm* — Thomas W. Galvani, P.C.; Thomas W. Galvani

(57) ABSTRACT

A planar multilayer transformer in a power converter wherein winding arrangements and placement of shields reduces common mode noise to a level wherein the common mode inductor in an input EMI filter can be reduced and even eliminated decreasing the power dissipation and increasing the power density. The methods presented herein can reduce the number of layers in the multilayer PCB by eliminating the layers used for the shields and still be in full compliance with EMI requirements.

14 Claims, 12 Drawing Sheets

(56) References Cited

U.S. PATENT DOCUMENTS

| | | |
|---|---|---|
| 8,023,294 B2 | 9/2011 | Ryan et al. |
| 11,374,499 B2 * | 6/2022 | Jitaru et al. |
| 11,450,470 B2 * | 9/2022 | Jitaru ........................ H01F 27/38 |
| 11,929,198 B2 * | 3/2024 | Jitaru ........................ H01F 27/346 |
| 12,132,397 B2 * | 10/2024 | Jitaru ........................ H02M 1/44 |
| 2004/0233683 A1 | 11/2004 | Park |
| 2008/0007381 A1 | 1/2008 | Odell et al. |
| 2009/0212754 A1 | 8/2009 | Ryan et al. |
| 2016/0307695 A1 | 10/2016 | Jitaru |
| 2017/0163164 A1 | 6/2017 | Martin |
| 2017/0181257 A1 | 6/2017 | Rostamzadeh et al. |
| 2020/0211762 A1 | 7/2020 | Jitaru et al. |

* cited by examiner

Planar transformer board structure

1. $I_C(t) = C * \frac{V_C(t)}{dt}$

2. $\Delta V_{S(on)} \cong V_{in}$

3. $\Delta V_{S(off)} = V_{in} + n * V_o$

4. $n = \frac{N_p}{N_s}$

5. $N_p = N_{p1} + N_{p2} + N_{p3} + N_{p4}$

6. $N_s = N_{s1} + N_{s2}$

7. $V_x = \frac{\Delta V_{ON}}{N_p}$

8. $V_y = \frac{\Delta V_{off}}{N_p}$

9. $\Delta V_{A'B'on} = V_x * N_{p2}$

10. $\Delta V_{A'B'off} = V_y * N_{p2}$

PLANAR MULTILAYER TRANSFORMER WITH MINIMUM NOISE INJECTION IN BETWEEN PRIMARY AND SECONDARY WINDING

CROSS-REFERENCE TO RELATED APPLICATIONS

This application is a continuation-in-part of and claims the benefit of prior U.S. patent application Ser. No. 18/596,383, filed Mar. 5, 2024, which is a continuation of and claims the benefit of U.S. patent application Ser. No. 17/948,966, filed Sep. 20, 2022, which is a continuation of and claims the benefit of U.S. patent application Ser. No. 17/524,495, filed Nov. 11, 2021, which claims the benefit of U.S. Provisional Application No. 63/112,564, filed Nov. 11, 2020, all of which are hereby incorporated by reference in their entireties.

FIELD

The present specification relates generally to electronic devices, and more particularly to power transformation.

BACKGROUND

In the quest for high density power converters, there is a focus is on efficiency, on miniaturization of magnetic elements, and on reduction of the number of components. In recent years, there is a trend for power adapters to decrease size, fueled by the fact that the electronic devices powered by the AC-DC adapters—such as laptops, mobile phones—have decreased significantly in size.

One key element in a power converter is the magnetic transformer. The magnetic transformer occupies a significant volume in the power adapters, ranging from 20% to 40% or even more.

Presently, most laptops, tablets require for operation a power level ranging from 30 W to 65 W. Due to the significant technological advancement in portable computing devices, the size of laptops and tablets has been significantly reduced, and yet the AC-DC adapters used to power such devices remain quite large (for example, dimensions of a typical adaptor for a small tablet device are about 3.3" by 1.8" by 1.3" or so). This has created pressures for size reduction of AC-DC adapters.

Increasing power density of magnetic transformers in power conversion applications with very high density while minimizing power dissipation can lead help this miniaturization. To reduce the size of the adapters while maintaining cooling and maintaining or increasing power requires some significant improvement in efficiency of the adapters. Besides the power transformer, another section of the AC-DC adapter which occupies a large volume is the input EMI filter. The EMI filter occupies approximately 10% to 20% of the volume of an AC-DC adapter. There are areas for improvement in size and performance of power converters.

SUMMARY

In an embodiment, a system for reducing common-mode noise includes a switch mode power supply including primary and secondary sides, primary and secondary grounds, an input voltage source, a primary switch, a transformer core having at least two magnetic legs, a planar multilayer transformer having primary windings and primary auxiliary windings which report to the primary and surrounds the magnetic legs and secondary windings and secondary auxiliary windings which report to the secondary and surrounds the magnetic legs, and a power output, wherein the primary windings and the secondary windings have primary and secondary quiet terminations, respectively, wherein the voltage does not change with respect to the primary and with respect to the secondary side ground; wherein the primary windings and the secondary windings have primary and secondary noisy terminations, respectively, wherein the voltage changes most with respect to the primary and with respect to the secondary side ground; a first shield, using fractional turns, placed on a first shield layer having a center tap which is connected to the primary ground, and two terminations on left and right sides of the center tap, wherein each termination has a maximum of one turn with respect to the center tap, wherein the voltage induced in each termination with respect to center tap has opposite polarities; and a second shield on a second shield layer, wherein the second shield contains a plurality of turns.

In embodiments, the first shield is placed on the first shield layer proximate to the quiet termination of the primary windings; and a displacement current injected the first shield into the secondary windings has a same amplitude and an opposite polarity of another displacement current injected by the primary windings into the secondary windings. The second shield is placed on the second shield layer proximate to the primary noisy termination; and a displacement current injected by the second shield into the secondary windings has a same amplitude and an opposite polarity of another displacement current injected by the primary windings into the secondary windings. The first shield is placed on the first shield layer proximate to the quiet termination of the primary windings and the second shield is placed on the second shield layer proximate to the primary noisy termination. A displacement current injected by the first shield and the second shield into the secondary windings has a similar amplitude and an opposite polarity of another displacement current injected by the primary windings into the secondary windings. The first shield is placed on the same layer and proximate to the quiet termination of the primary windings; and a displacement current injected by the first shield into the secondary windings has a same amplitude and an opposite polarity of another displacement current injected by the primary windings into the secondary windings. The second shield is placed on the same layer and proximate to the primary noisy termination; and a displacement current injected by the second shield into the secondary winding has a similar amplitude and an opposite polarity of another displacement current injected by the primary windings into the secondary winding. The first shield is placed on the same layer and proximate to the quiet termination of the primary windings and the second shield is placed on a common layer and proximate to the primary noisy termination; and a displacement current injected by the first shield into the secondary windings has a same amplitude and an opposite polarity of the displacement current injected by the primary windings into the secondary windings.

In an embodiment, a system for reducing common-mode noise includes a switch mode power supply including primary and secondary sides, primary and secondary grounds, an input voltage source, two primary switches placed in series across the input voltage source, a transformer core having at least two magnetic legs, a planar multilayer transformer having primary windings and primary auxiliary windings which report to the primary and surrounds the magnetic legs and secondary windings and secondary auxiliary windings which report to the secondary and surrounds the magnetic legs, said transformer primary windings placed in series to a capacitor connected to an input ground and a power output, wherein the primary windings and the secondary windings have primary and secondary quiet terminations, respectively, wherein the voltage does not change with respect to the primary and with respect to the secondary side ground; wherein the primary windings and the secondary windings have primary and secondary noisy terminations, respectively, wherein the voltage changes most with respect to the primary and with respect to the secondary side ground; and a first shield, using fractional turns, placed on a first shield layer having a center tap which is connected to the primary ground, and two terminations on left and right sides of the center tap, wherein each termination has a maximum of one turn with respect to the center tap, wherein the voltage induced in each termination with respect to the center tap has opposite polarities; and a second shield on a second shield layer, wherein the second shield contains a plurality of turns.

In embodiments, the first shield is placed on the first shield layer proximate to the quiet termination of the primary windings; and a displacement current injected by the first shield into the secondary windings has a same amplitude and an opposite polarity of the displacement current injected by the primary windings into the secondary windings. The second shield is placed on the second shield layer proximate to the primary noisy termination; and a displacement current injected by the second shield into the secondary windings has a same amplitude and an opposite polarity of another displacement current injected by the primary windings into the secondary windings. The first shield is placed on the first shield layer proximate to the quiet termination of the primary windings and the second shield is placed on a layer in vicinity of the primary noisy termination; and a displacement current injected by the first shield and the second shield into the secondary windings has a similar amplitude and an opposite polarity of the displacement current injected by the primary windings into the secondary windings. The first shield is placed on the same layer and proximate to the quiet termination of the primary windings; and a displacement current injected by the first shield into the secondary windings has a same amplitude and an opposite polarity of another displacement current injected by the primary windings into the secondary windings. The second shield is placed on the same layer and proximate to the primary noisy termination; and a displacement current injected by the second shield into the secondary winding has a similar amplitude and an opposite polarity of another displacement current injected by the primary windings into the secondary winding. The first shield is placed on the same layer and proximate to the quiet termination of the primary windings and the second shield is placed on the same layer and proximate to the primary noisy termination; and a displacement current injected by the first shield and the second shield into the secondary windings has a same amplitude and an opposite polarity of the displacement current injected by the primary windings into the secondary.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1A:
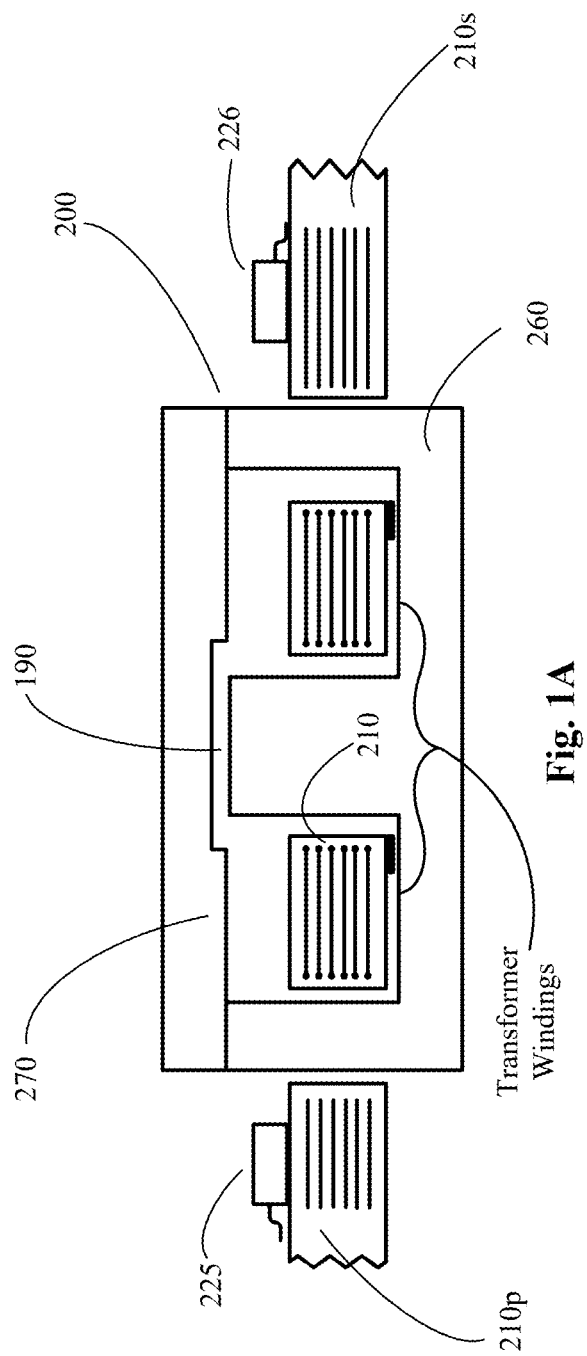
FIG. 1A presents a construction of an integrated planar transformer.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1A presents a section of an integrated multilayer transformer board containing a multilayer PCB 210, which is split into two regions to maintain a safety distance between primary and secondary components. The secondary components 226 are placed on the secondary PCB region 210s, while the primary components 225 are placed on the primary PCB region 210p. The magnetic ferrite core, assembled through the multilayer PCB, is formed by the E core 260 and an I plate 270. An air gap 190 is made in the plate core to prevent the magnetic field from closing through the PCB.

Figure 1B:
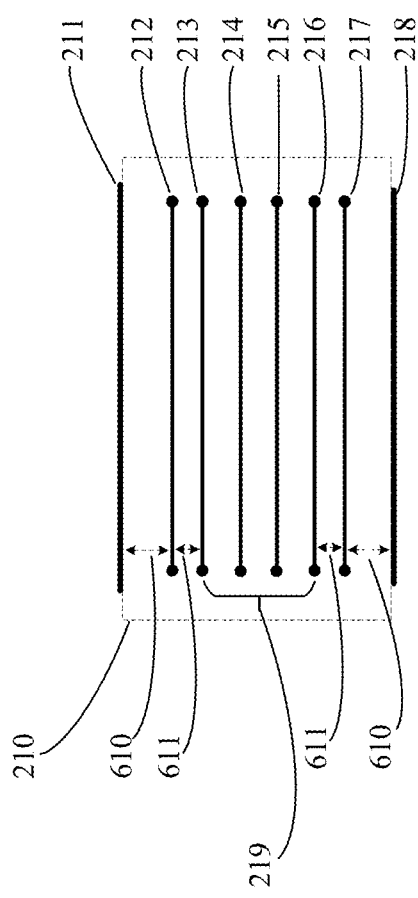
FIG. 1B illustrates a planar transformer board structure.
Figure 6:
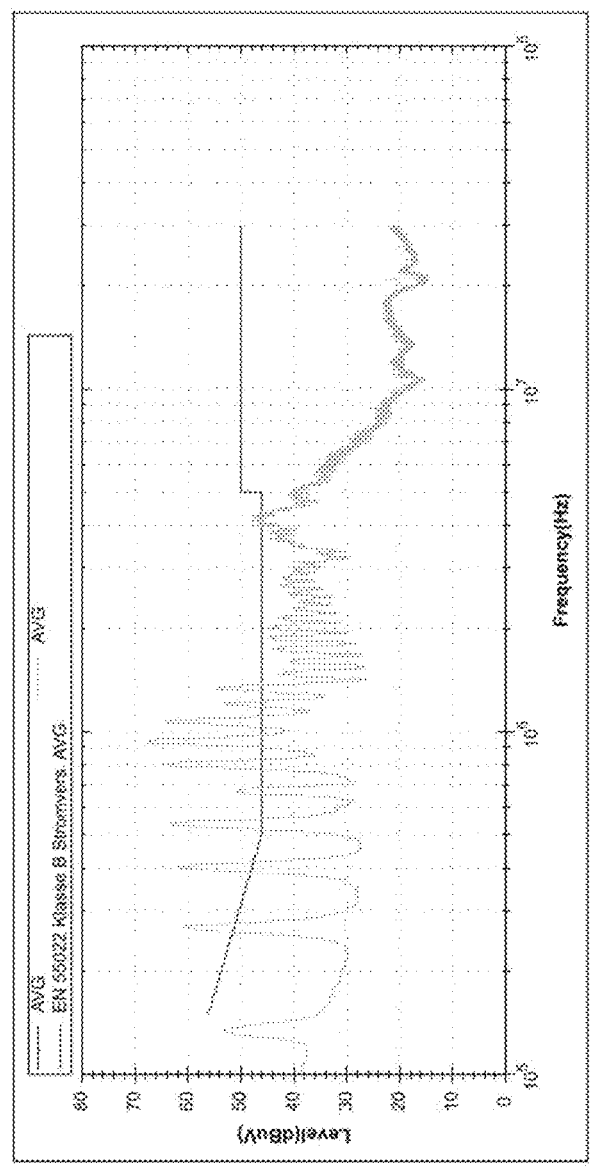
FIG. 6 presents EMI results with a common solution for shielding without any CM filter on the input filter.

FIG. 1B shows the structure of the multilayer PCB 210, which is determined by the planar transformer structure. It includes the secondary windings 211 and 218, and the primary side windings 212, 219, and 217. Layers 219 are allocated to the primary windings, and layers 212 and 217 are allocated to the shield and in some applications, to auxiliary windings. One of the layers dedicated to the shield such as 212 or 217 is allocated for the first shield, as presented in FIG. 6A of prior application U.S. Pat. No. 11,929,198 (to which this application claims benefit), wherein the first shield contains a fractional turn shield configuration. The first shield refers to a fractional turn shield configuration as depicted in FIG. 6A of U.S. Pat. No. 11,929,198. Layer 217 is allocated for the second shield, referred to herein as a multiple turns shield which shall contain at least one turn. Both shields—the first shield and the second shield—have a double role: one role is to create an electrostatic shield, to reduce the first displacement current in between the primary winding and the secondary winding generated by the primary winding; and a second role is to create a displacement current towards the secondary generated by the fractional or complete windings of the shield. The displacement current generated by the shield is referred to herein as cancellation noise injection, or noise injection aimed at cancelling the displacement current caused by the voltage swing in the primary winding and injected into the secondary winding. Layer 219 represents the primary winding, with auxiliary windings. The distance 610 between the primary and secondary complies with safety regulations. Additionally, the distance 611 creates a controlled capacitance between the primary winding and the 217 and 213 shield. A small value for 611 adds to the parasitic capacitance reflected across the primary switch, which is generally not preferred.

A First Embodiment

Figure 2:
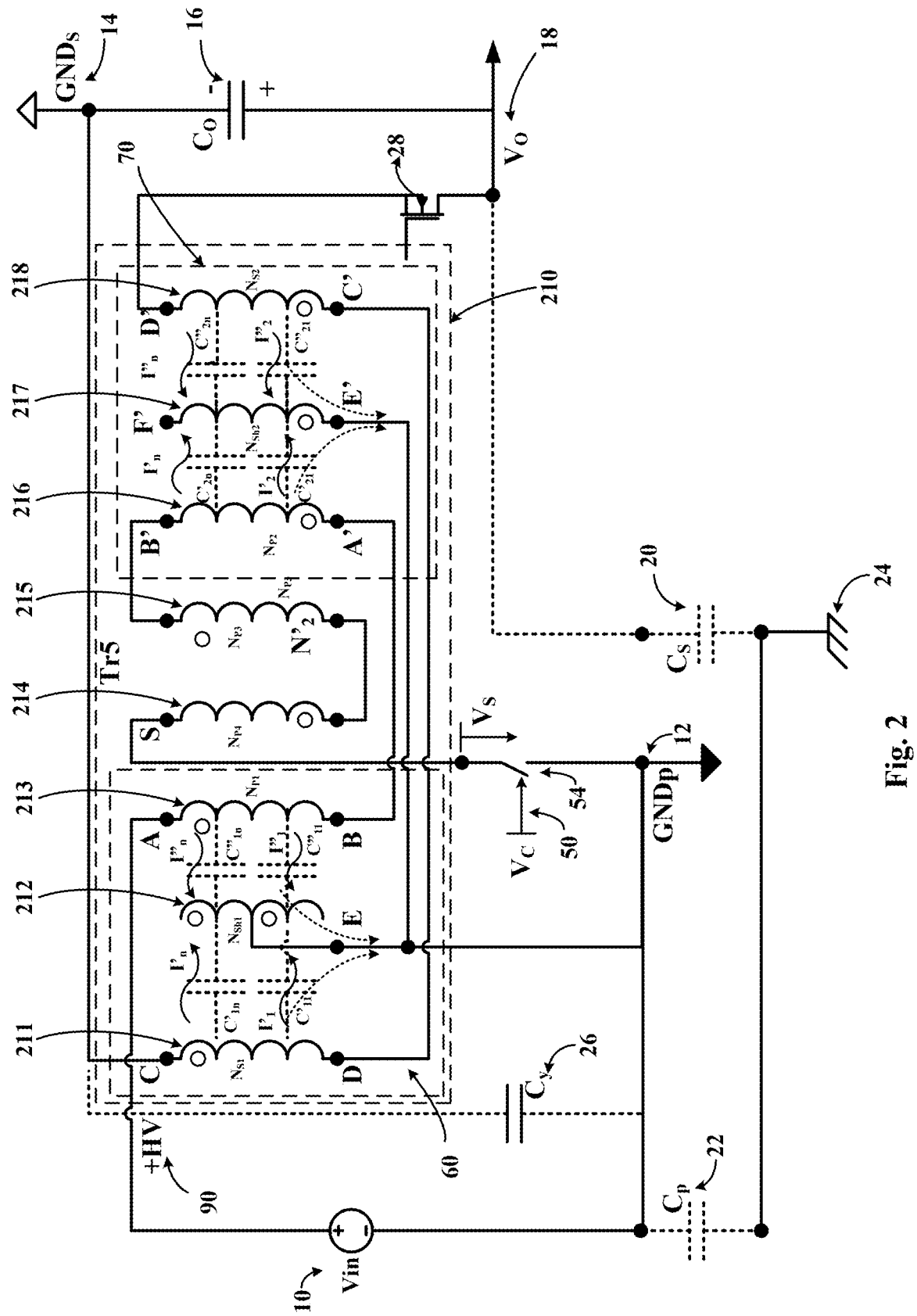
FIG. 2 illustrates an embodiment of an electrical implementation of the planar transformer in a high side configuration in secondary side.

A first embodiment introduces structures and methodologies for further reducing displacement current through the parasitic capacitance between primary and secondary windings. Here are presented winding arrangements in which the common mode noise caused by the displacement current between the primary and secondary windings is minimized to a level for which there is no need any more for the common mode choke in the input filter stage. A Flyback planar transformer is created, as depicted in FIG. 2, which eliminates the need for a common mode choke. FIG. 2 presents a planar transformer structure, which includes an input voltage source 10 connected to the transformer through the +HV connection 90, to point A of the primary winding. The end of the primary winding, point S, connects to the primary switch 54 and further to the primary GNDp 12. The secondary side has a high-side configuration in reference to the synchronous rectifier, 28, including an output capacitor, 16, a synchronous rectifier 28, and secondary windings allocated on two layers 211 and 218.

Figures 3A, 3B:
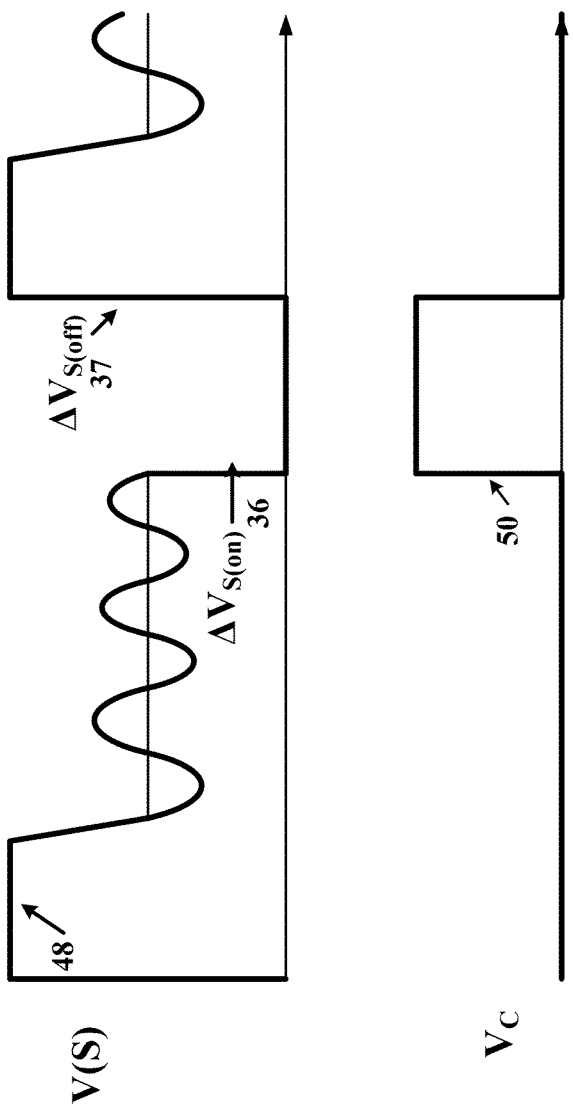
FIG. 3A presents equations used in the below description.
FIG. 3B presents waveforms of the embodiment of FIG. 2.

According to Equation 1 in FIG. 3A, the displacement current between primary and secondary is minimized by reducing the parasitic capacitance and/or the voltage swing between the windings. The cancellation noise injection is tuned to cancel common mode current in the transformer, wherein shields were added on layers 212 and 217.

In the planar transformer configuration, quiet region 60 is identified. A quiet region of a transformer winding is defined as the section of the winding which has a low voltage swing and that applies to the winding which is connected to a source which does not have a large voltage swing such as the input voltage source, like Vin,10, to primary and secondary ground like GNDp, 12, and GNPs, 14 and output voltage Vo, 18.

The first shield, referred to also as fractional turns shield, is placed in the quiet region 60 on layer 212, between the quiet termination of the primary winding 213 and the secondary winding 211.

A first shield, using fractional turns, is placed on a first shield layer having a center tap which is connected to the primary ground, and two terminations on left and right sides of the center tap, wherein each termination can have from maximum one turn with respect to the center tap wherein the voltage induced in each termination with respect to center tap will have opposite polarities.

The first shield is also referred to as fractional turns shield, as in U.S. Pat. No. 11,929,198. This first shield operates mostly as an electrostatic shield but also as a cancelation noise injection. An example of a first shield layout, placed in between the secondary winding 211 and the quiet section of the primary winding, 213, is presented in FIG. 7B. The role of this shield is to act more like an electrostatic shield and also as a low amplitude cancelation noise injection winding.

Analyzing the shield placed on layer 212, when a voltage is applied on the dot of the quiet termination of the primary winding 213 (to point A), it induces a voltage of the same polarity in the first shield 212 and in the secondary winding 211 but with different amplitude, accordingly with the number of turns. The voltage swing is of the same polarity to compensate with the shield a smaller voltage swing due to the use of fractional turns.

The equations from FIG. 3A determine the voltage swing per turn (per layer between two points) across the primary winding during the turn-on and turn-off of the primary switch, which enables determination of the voltage reflected on the shield and the secondary winding. If the voltage variations between layers is approaching 0V, the displacement current across the parasitic capacitance also approaches 0A, eliminating common mode noise.

Another benefit of region 60 with the application of the first shield 212 is that connecting it at the half turn induces a half voltage swing between the secondary Ns1 and the shield Nsh1, reducing the current displacement I'n by half from secondary to shield. Even though the displacement current from the primary winding to the shield I"n is higher due to the smaller distance between primary and shield compared to secondary and shield, current I" returns to the primary GND and does not impact the common mode noise.

This specification uses the terminology of a second shield, referred to also as a multiturn shield. In the planar transformer configuration, the noisy region 70 is identified. The noisy region of a transformer winding is defined as the section of the winding which has a high voltage swing and that applies to the winding which is connected to switching elements such as the primary switch 54, and the rectifier means, implemented in FIG. 2 by a synchronous rectifier, 28. For the noisy part of the structure 70, a multi turn shield cancels the displacement current from primary winding, 216, to secondary winding, 218, by having the same voltage swing in the shield, 217, as the voltage swing VA'B'. From Equation 1 in FIG. 3A, if the voltage swing is zero, then the current is zero. Applying the same equation to the secondary winding shows a small voltage swing, but the capacitance is very small due to the higher distance 610 between layers, as depicted in FIG. 2, ensuring the safety distance between primary and secondary sides.

Figure 4:
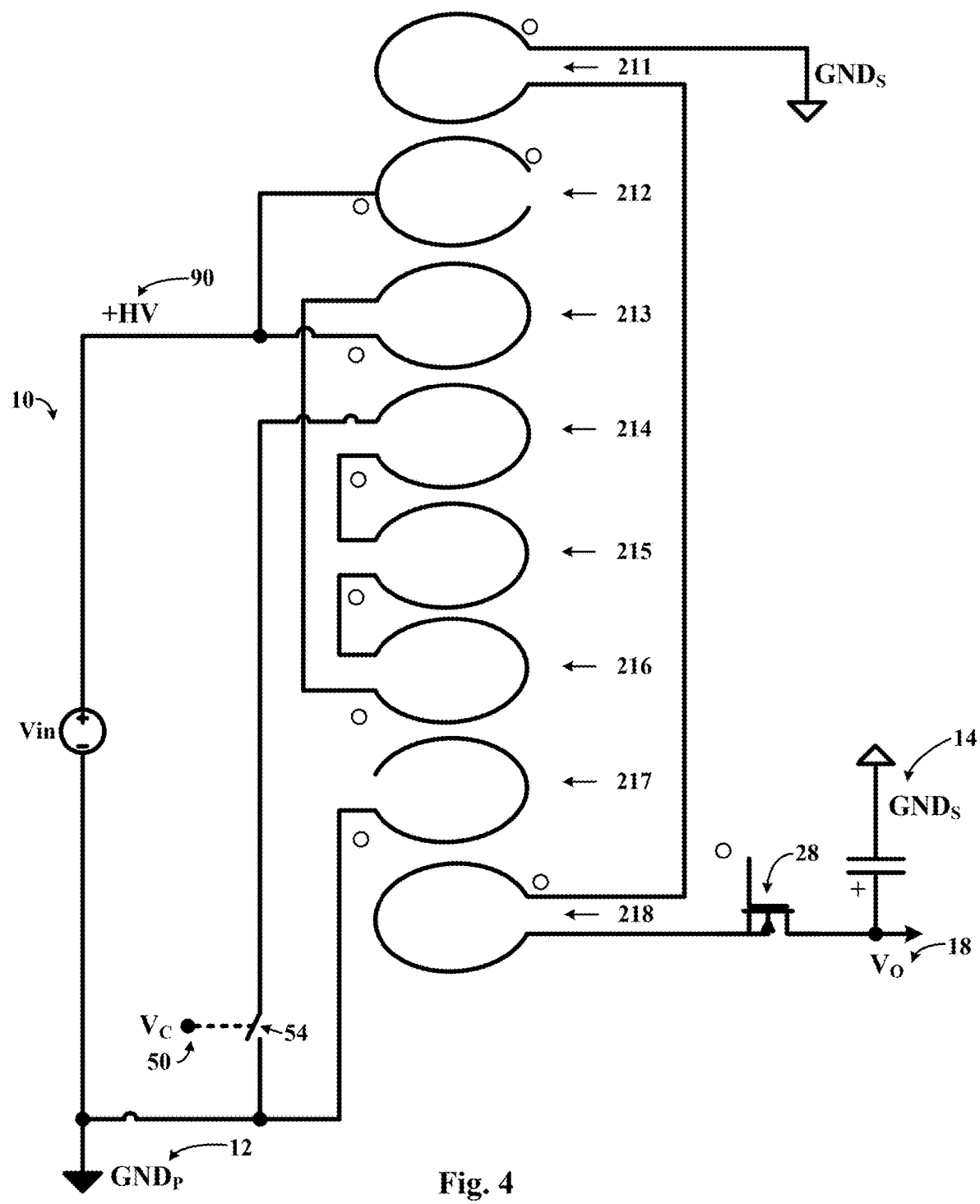
FIG. 4 illustrates a planar interconnection of the planar structure for high side alternative configuration.

FIG. 4 illustrates the interconnection of the planar transformer windings on the layers. It shows the secondary winding on the top 211 and bottom 218 layers, while the primary side with shields is on layers 212 and 217, and the primary winding is on layers 213, 214, 215, and 216. The shield on layer 212 can also be connected to the primary GND if used for other purposes like primary bias. The primary winding is split into four layers in this example: layer 213 contains the first three turns and the quietest termination, close to the quietest termination of the secondary winding, and the 0.5 turn first shield. The primary winding continues to layer 216 with the next three turns, returns to layer 215 with four turns, continues to layer 214 with the last four turns, and then goes to the primary switch and primary GND. The second shield on layer 217 is also used for the ZCD/bias function of the flyback converter.

The quietest layer in the primary is layer 213, followed by layer 216. The noisiest layer is layer 214 followed by layer 215.

In FIG. 4, the first shield is placed between layer 213 which is a quiet layer, and the secondary placed on layer 211. The placement of the first shield in proximity of the quiet layer 213 reduces the displacement current injected into the secondary winding 211.

The second secondary layer is 218, and the second shield is placed in the vicinity of, or proximate to, the layer 216 which is the second quiet layer. Though the layer 216 has a larger voltage swing than layer 213, the multiturn shield 217 acts as a noise cancelation, reducing and even canceling the displacement current produced by layer 216 and injected into the secondary layer 218. FIG. 4 illustrates an example of layer placement for reducing the displacement current produced by the primary winding into the secondary winding and reducing significantly the common mode EMI to the level wherein the common mode choke in the EMI filter may not be required.

Figure 5:
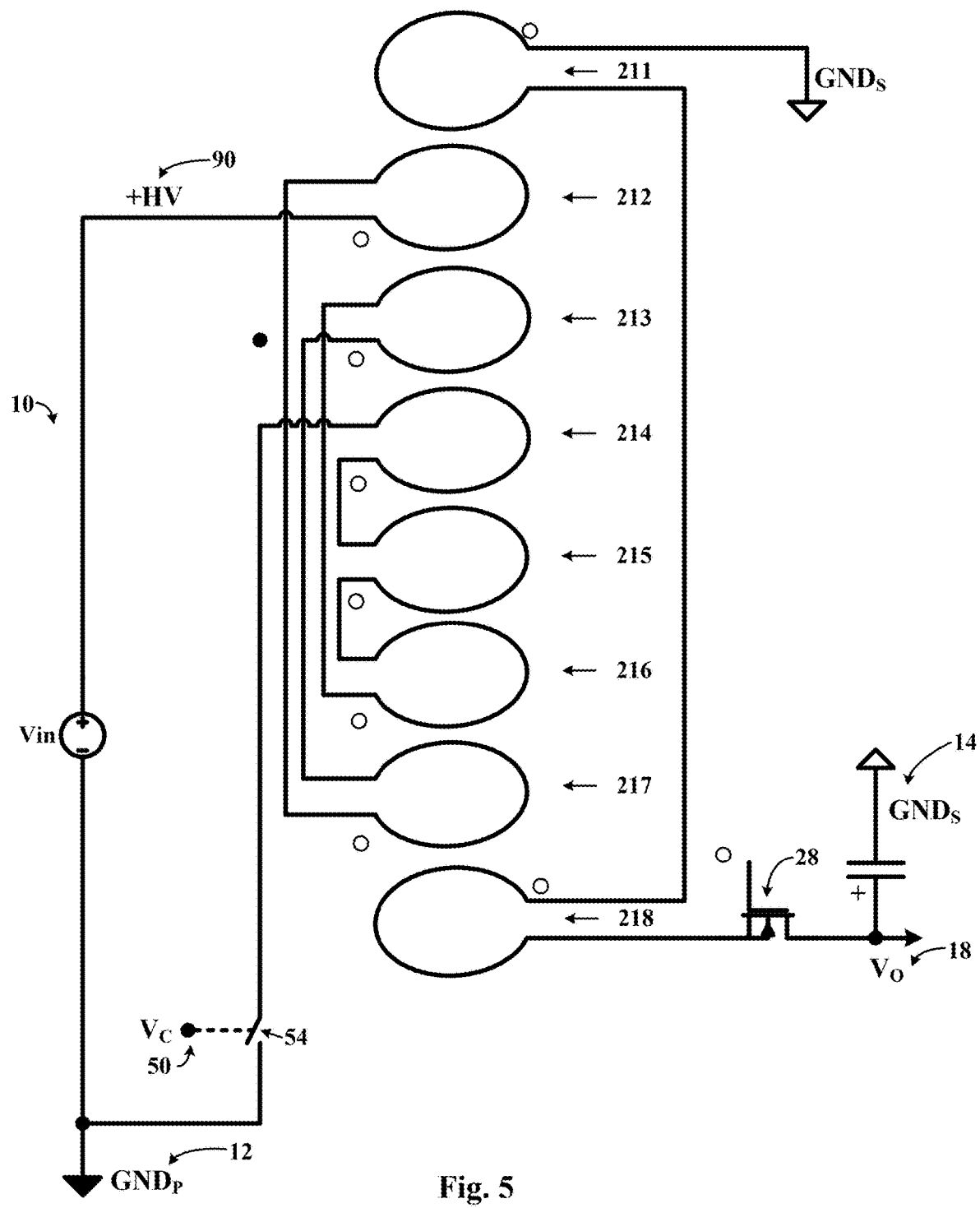
FIG. 5 illustrates a prior art planar interconnection of the planar structure for high side configuration.

FIG. 5 illustrates a popular arrangement of windings. This shield is part of the primary winding. The EMI was measured without any common mode inductor in the input EMI filter, and the results are presented in FIG. 6.

Figure 7A:
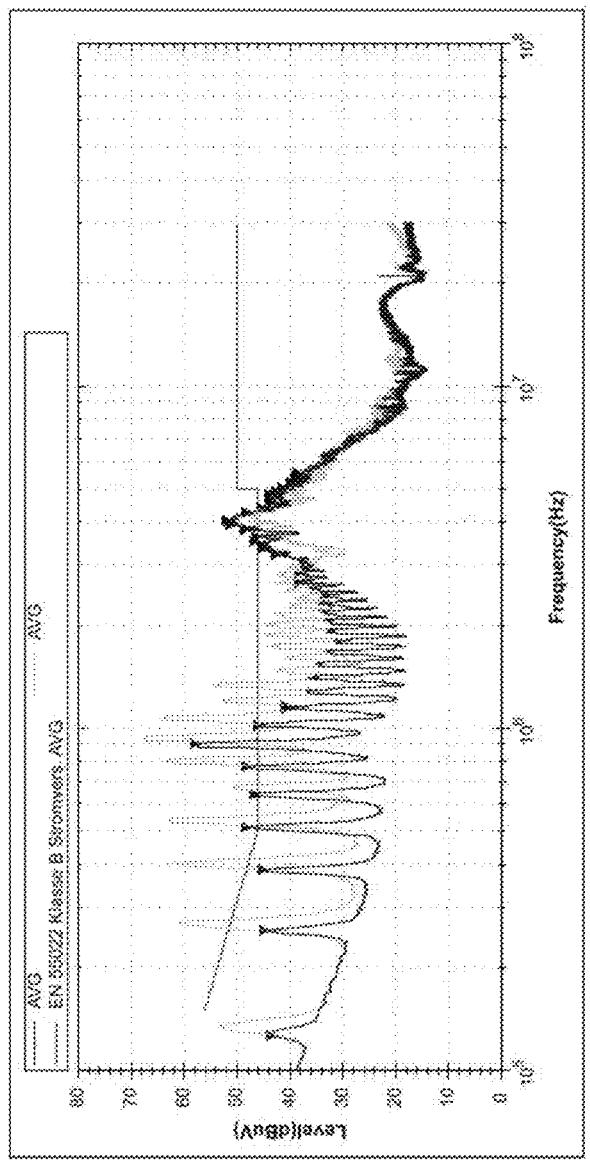
FIG. 7A. presents EMI results with an embodiment with high side configuration.
Figure 7C:
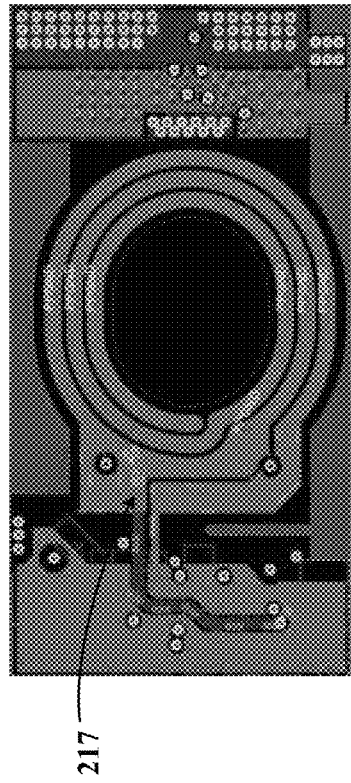
FIG. 7C presents a winded shield layer placed in a noisy area of planar windings.
Figure 7B:
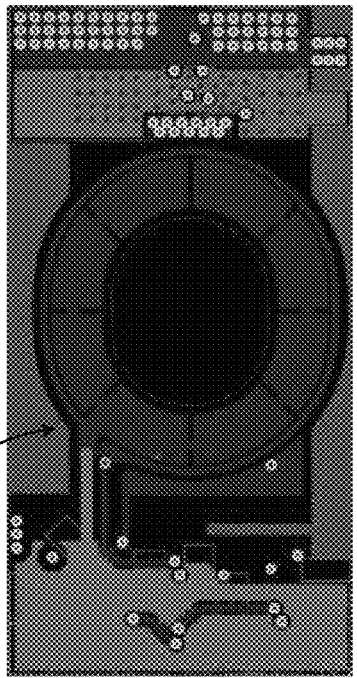
FIG. 7B presents the shield layer placed in a quietest area of planar windings.

FIG. 7A compares EMI measurement results between the shielding concept presented in U.S. Pat. No. 5,990,776 and the shielding technique presented in the first embodiment disclosed here and shown in FIG. 2. FIGS. 7B and 7C show the implementation of the first shield and the second shield as described herein.

Figure 8:
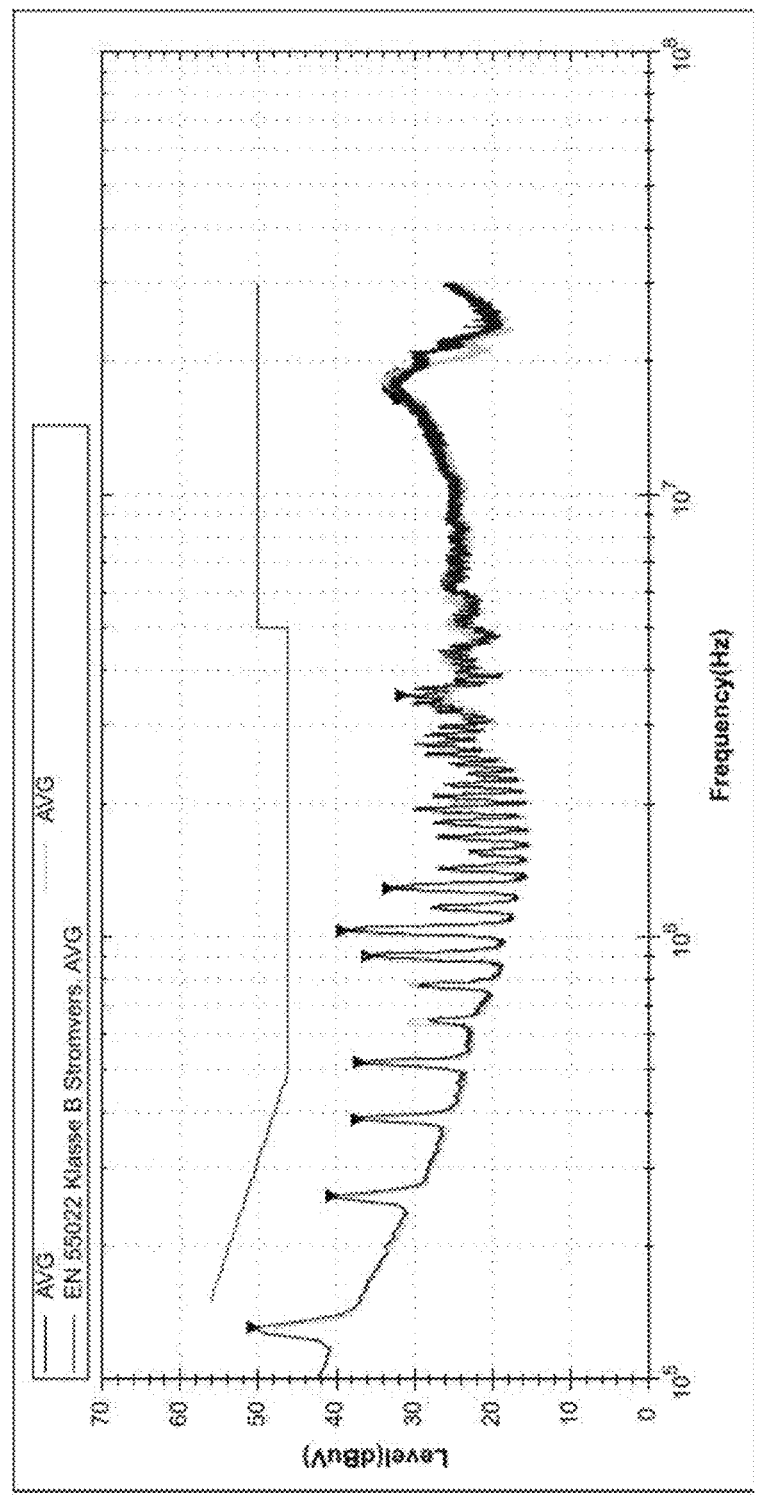
FIG. 8 presents EMI results from adding a CM filter on the input filter stage.

FIG. 8 presents the EMI results with a very small CM choke on the input side. Analyzing FIG. 7A shows that the common mode choke attenuates around 7 dBuV at a higher frequency (1 MHz). The use of this first embodiment allows full compliance with EN 55022 Klasse B in a multilayer PCB transformer using a smaller CM choke with lower impedance loss and a smaller volume in the input filter. This has the effect of increasing the power converter efficiency and also allows a higher power density.

A Second Embodiment

Figure 9:
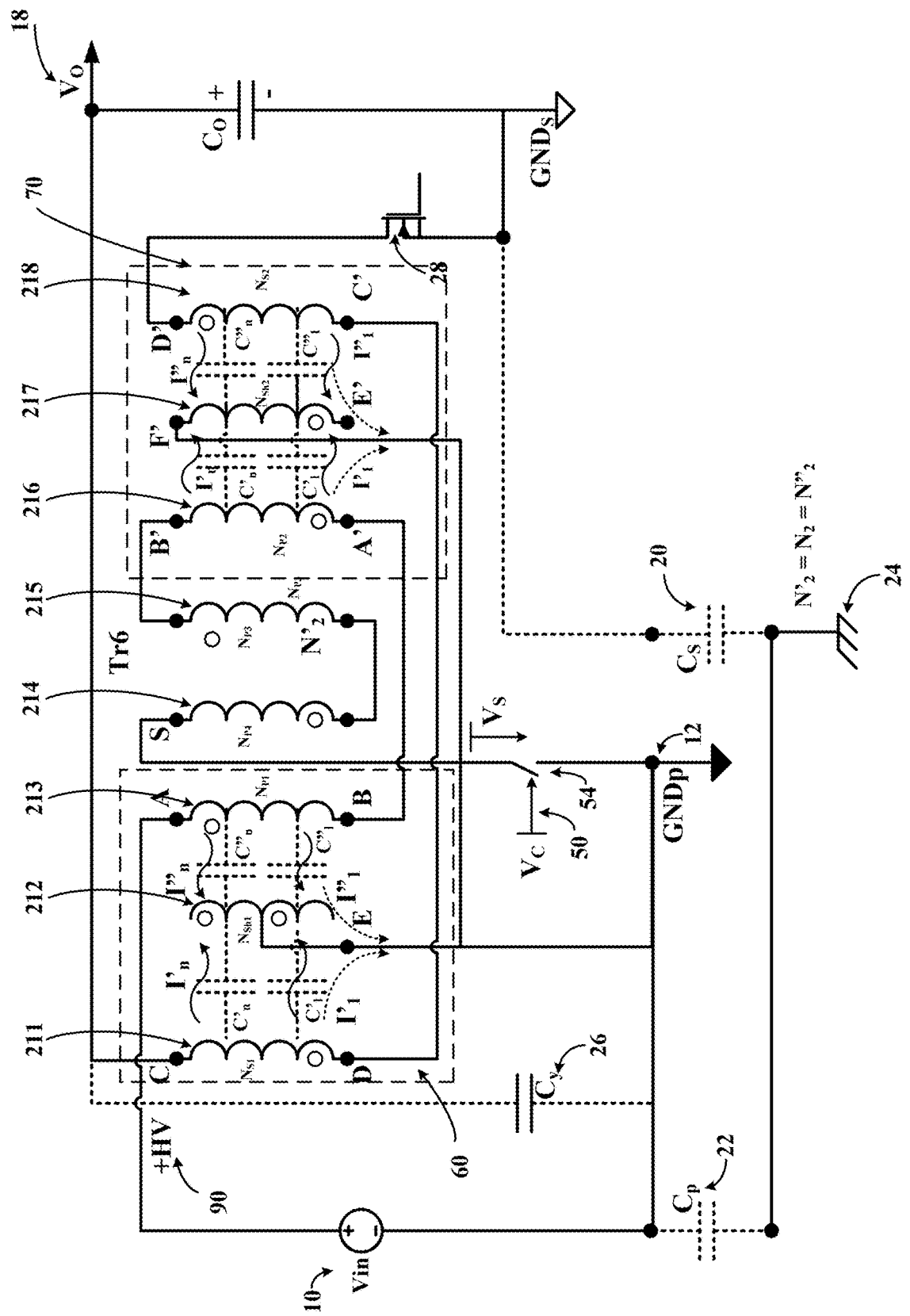
FIG. 9 illustrates an embodiment of an electrical implementation of the planar transformer in a low side configuration in secondary side.

FIG. 9 presents a second embodiment in which a planar transformer is implemented with a secondary switch connected to the secondary ground (referred to as the low-side switch configuration). Here, the quietest termination of the secondary winding is the output voltage Vo 18, and this part of the secondary winding is the quietest planar region 60. In this embodiment, the system uses an input source 10 connected to terminal A of transformer Tr6 through the HV+ 90 connection. The terminal S of the transformer is the output connection, which binds to the primary switch 54, and then the power loop is closed to the primary ground. Power is transferred to the secondary side through the power transformer Tr6, which has a primary winding structure that overlaps the secondary winding on the top and bottom of the PCB, as described in FIG. 10. The secondary side circuit uses the output capacitor Co, the secondary winding (which is part of the planar transformer Tr6), and the secondary rectifier means, the synchronous rectifier 28. The positive terminal of the output capacitor is connected to terminal C of Tr6 through the Vo 18 connection, which can be considered the quietest secondary connection to the transformer. This part of the secondary winding 211 is placed in the quietest region 60 of the transformer, and then the winding continues with the next turn (in the case wherein the secondary winding has two turns) to layer 218, which is connected with terminal D' to the secondary switching device, 28. In this configuration, the dot of the secondary winding is changed to the secondary switching device, and as a disadvantage, the voltage swing in the secondary winding is in the opposite direction of the primary voltage swing, requiring the shields to compensate for more common mode noise.

Analyzing the voltage swing across the primary winding between termination A and termination B, and for the secondary winding between termination C and termination D, it can be seen how the voltage level should be compensated and in which direction by the shield placed on layer 212.

For region 70, when the secondary winding is connected to the secondary switching device by termination D', the shield could reduce the noise from the primary winding if the voltage swing in the shield has the same amplitude and direction as the voltage swing between termination A' and B'. For this reason, the shield is connected to the primary GND by termination F'.

Figure 10:
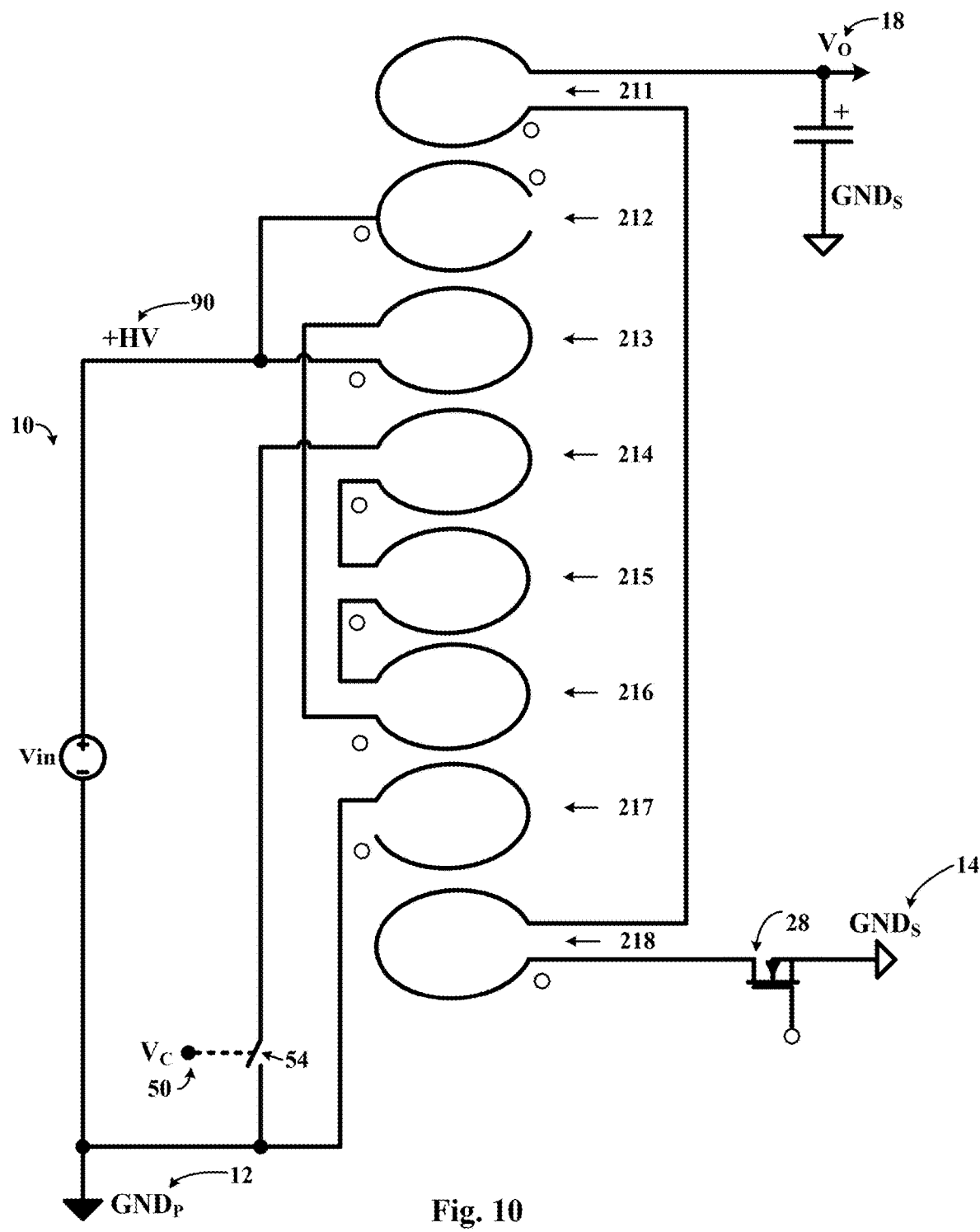
FIG. 10 illustrates a planar interconnection of the planar structure for a low side alternative configuration.

FIG. 10 illustrates the planar transformer layer interconnection on each layer of the 8-layer PCB for the second embodiment described above.

A Third Embodiment

Figure 11:
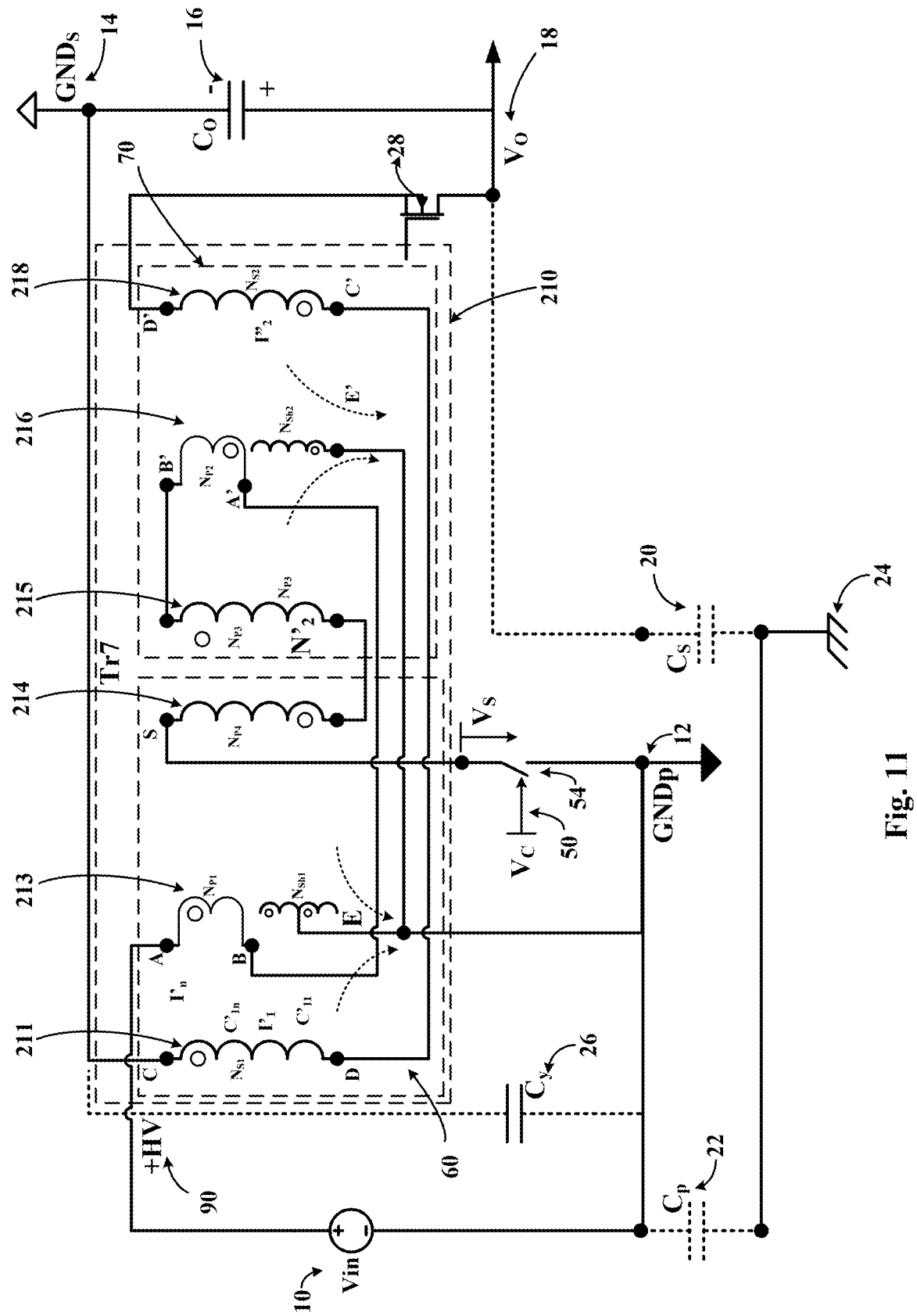
FIG. 11 illustrates an embodiment of an implementation of the planar transformer in 6-layer PCB in flyback topology.

FIG. 11 illustrates another embodiment which has a smaller number of layers in the planar transformer board. The multilayer PCB 210 is configured with 6 layers, and layers 212 and 217 from the previous description are eliminated. The first shield and the quiet turns of the primary winding are combined on the same layer 213, so that the voltage swing across the primary turns placed on layer 213 is close to the voltage swing induced in the secondary side between terminations C and D. The shield is placed on the unoccupied window of layer 213 to compensate for the displacement current from layer 214 into the layer 211. The first shield E also has the double role as described in the previous addendums.

On the other side of planar 70, where the switching node of the secondary termination D' is located, some primary winding turns are placed together with the shield on layer 216.

The principle for choosing how many turns of the primary winding are placed on layer 216, a voltage swing across the turns on that layer should be close to half of the voltage swing on the secondary, as the secondary is split into two sections: top 211 and bottom 218. In other words, preferably, the layer 216 should contain a number of turns of the primary winding such that the voltage swing across those turns is close to half of the voltage swing on the secondary, as the secondary is split into two sections: top 211 and bottom 218.

To minimize the displacement current between the secondary winding and the primary/shield winding, there is preferably a smaller voltage difference between the primary winding and the secondary winding. When VAB=VCD, the displacement current between the secondary and primary winding is zero for that section of the planar arrangement, and the shield compensates for the other side of the planar structure.

A Fourth Embodiment

Figure 12:
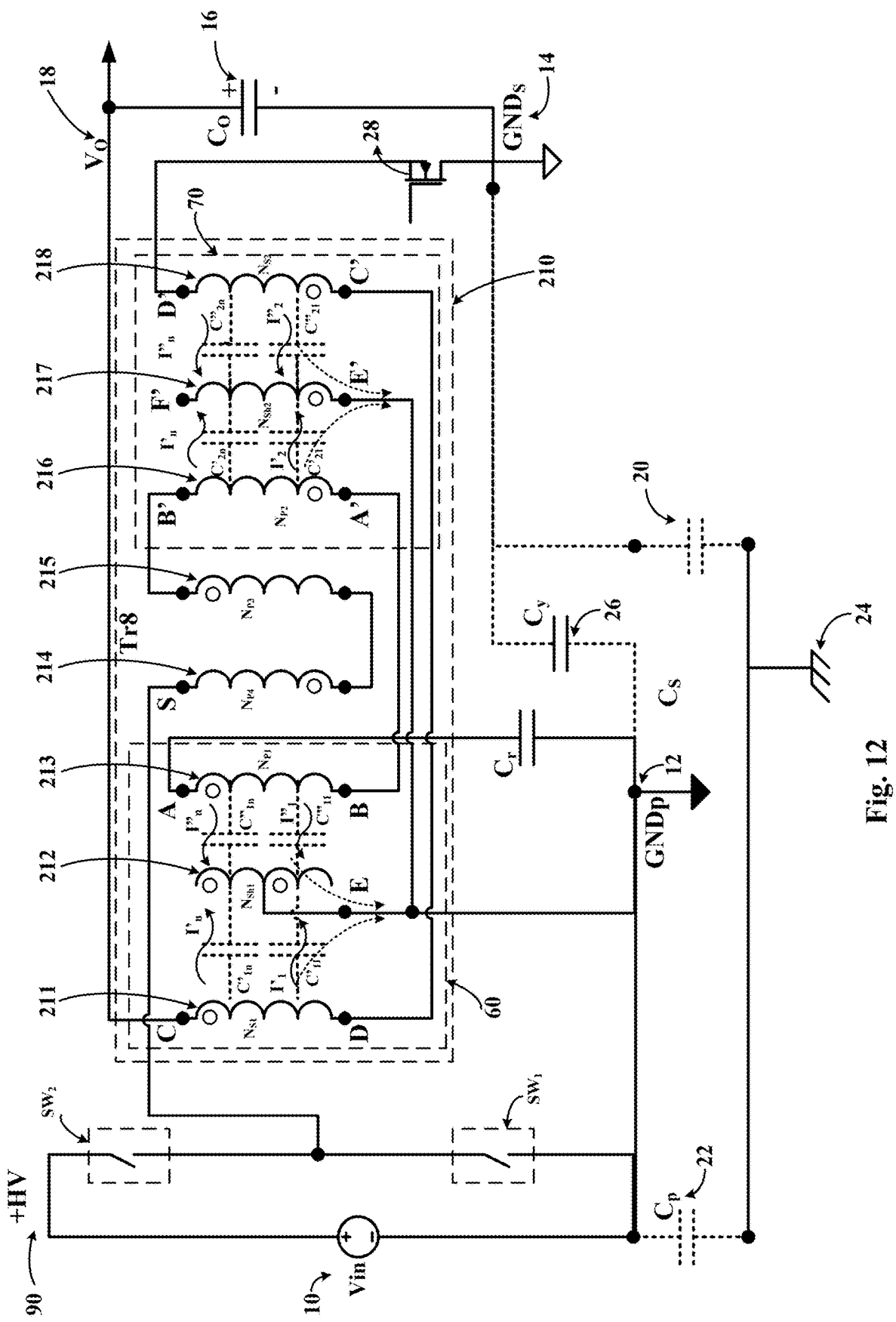
FIG. 12 illustrates an embodiments of an implementation of the planar transformer in hybrid flyback topology.

FIG. 12 is an embodiment of an implementation of a planar transformer in a hybrid flyback topology. Here, for the low-side secondary switch, the voltage swing in the secondary winding is in the same direction as the voltage swing in the primary winding. The primary side circuit includes of an input source 10, two switching elements SW1 and SW2, a planar transformer Tr8, and a resonant capacitor Cr. On the secondary side, the circuit is the same as in a flyback topology.

To achieve the lowest EMI, the transformer is preferably built in a way that minimizes the common mode noise from the transformer. The termination A of the transformer Tr8 is at a constant voltage and is considered the quietest point in the planar transformer. Termination S switches voltage between 0V and Vin and is the noisiest part of the transformer. To reduce EMI from the transformer, the quietest termination of the secondary winding Vo and the quietest termination of the primary winding, the resonant capacitor Cr, is placed on the quiet side of the planar transformer layer structure 60. Between these two layers, primary 213 and secondary 211, is placed a special half-turn shield on layer 212. This can be optimized if desired.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

The invention claimed is:

1. A system for reducing common-mode noise, the system comprising:
 a switch mode power supply including primary and secondary sides, primary and secondary grounds, an input voltage source, a primary switch, a transformer core having at least two magnetic legs, a planar multilayer transformer having primary windings and primary auxiliary windings which report to the primary and surrounds the magnetic legs and secondary windings and secondary auxiliary windings which report to the secondary and surrounds the magnetic legs, and a power output, wherein the primary windings and the secondary windings have primary and secondary quiet terminations, respectively, wherein the voltage does not change with respect to the primary and with respect to the secondary side ground;
 wherein the primary windings and the secondary windings have primary and secondary noisy terminations, respectively, wherein the voltage changes most with respect to the primary and with respect to the secondary side ground;
 a first shield, using fractional turns, placed on a first shield layer having a center tap which is connected to the primary ground, and two terminations on left and right sides of the center tap, wherein each termination has a maximum of one turn with respect to the center tap, wherein the voltage induced in each termination with respect to center tap has opposite polarities; and
 a second shield on a second shield layer, wherein the second shield contains a plurality of turns.

2. The system for reducing the common-mode noise of claim 1, wherein:
 the first shield is placed on the first shield layer proximate to the quiet termination of the primary windings; and
 a displacement current injected the first shield into the secondary windings has a same amplitude and an opposite polarity of another displacement current injected by the primary windings into the secondary windings.

3. The system for reducing the common-mode noise of claim 1, wherein:
 the second shield is placed on the second shield layer proximate to the primary noisy termination; and
 a displacement current injected by the second shield into the secondary windings has a same amplitude and an opposite polarity of another displacement current injected by the primary windings into the secondary windings.

4. The system for reducing the common-mode noise of claim 1, wherein:
 the first shield is placed on the first shield layer proximate to the quiet termination of the primary windings and the second shield is placed on the second shield layer proximate to the primary noisy termination; and
 a displacement current injected by the first shield and the second shield into the secondary windings has a similar amplitude and an opposite polarity of another displacement current injected by the primary windings into the secondary windings.

5. The system for reducing the common-mode noise of claim 1, wherein:
 the first shield is placed on the same layer and proximate to the quiet termination of the primary windings; and
 a displacement current injected by the first shield into the secondary windings has a same amplitude and an opposite polarity of another displacement current injected by the primary windings into the secondary windings.

6. The system for reducing the common-mode noise of claim 1, wherein:
 the second shield is placed on the same layer and proximate to the primary noisy termination; and
 a displacement current injected by the second shield into the secondary winding has a similar amplitude and an opposite polarity of another displacement current injected by the primary windings into the secondary winding.

7. The system for reducing the common-mode noise of claim 1, wherein:
- the first shield is placed on the same layer and proximate to the quiet termination of the primary windings and the second shield is placed on a common layer and proximate to the primary noisy termination; and
- a displacement current injected by the first shield into the secondary windings has a same amplitude and an opposite polarity of the displacement current injected by the primary windings into the secondary windings.

8. A system for reducing common-mode noise, the system comprising:
- a switch mode power supply including primary and secondary sides, primary and secondary grounds, an input voltage source, two primary switches placed in series across the input voltage source, a transformer core having at least two magnetic legs, a planar multilayer transformer having primary windings and primary auxiliary windings which report to the primary and surrounds the magnetic legs and secondary windings and secondary auxiliary windings which report to the secondary and surrounds the magnetic legs, said transformer primary windings placed in series to a capacitor connected to an input ground and a power output, wherein the primary windings and the secondary windings have primary and secondary quiet terminations, respectively, wherein the voltage does not change with respect to the primary and with respect to the secondary side ground;
- wherein the primary windings and the secondary windings have primary and secondary noisy terminations, respectively, wherein the voltage changes most with respect to the primary and with respect to the secondary side ground; and
- a first shield, using fractional turns, placed on a first shield layer having a center tap which is connected to the primary ground, and two terminations on left and right sides of the center tap, wherein each termination has a maximum of one turn with respect to the center tap, wherein the voltage induced in each termination with respect to the center tap has opposite polarities;
- a second shield on a second shield layer, wherein the second shield contains a plurality of turns.

9. The system for reducing the common-mode noise of claim 8, wherein:
- the first shield is placed on the first shield layer proximate to the quiet termination of the primary windings; and
- a displacement current injected by the first shield into the secondary windings has a same amplitude and an opposite polarity of the displacement current injected by the primary windings into the secondary windings.

10. The system for reducing the common-mode noise of claim 8, wherein:
- the second shield is placed on the second shield layer proximate to the primary noisy termination; and
- a displacement current injected by the second shield into the secondary windings has a same amplitude and an opposite polarity of another displacement current injected by the primary windings into the secondary windings.

11. The system for reducing the common-mode noise of claim 8, wherein:
- the first shield is placed on the first shield layer proximate to the quiet termination of the primary windings and the second shield is placed on a layer in vicinity of the primary noisy termination; and
- a displacement current injected by the first shield and the second shield into the secondary windings has a similar amplitude and an opposite polarity of the displacement current injected by the primary windings into the secondary windings.

12. The system for reducing the common-mode noise of claim 8, wherein:
- the first shield is placed on the same layer and proximate to the quiet termination of the primary windings; and
- a displacement current injected by the first shield into the secondary windings has a same amplitude and an opposite polarity of another displacement current injected by the primary windings into the secondary windings.

13. The system for reducing the common-mode noise of claim 8, wherein:
- the second shield is placed on the same layer and proximate to the primary noisy termination; and
- a displacement current injected by the second shield into the secondary winding has a similar amplitude and an opposite polarity of another displacement current injected by the primary windings into the secondary winding.

14. The system for reducing the common-mode noise of claim 8, wherein:
- the first shield is placed on the same layer and proximate to the quiet termination of the primary windings and the second shield is placed on the same layer and proximate to the primary noisy termination; and
- a displacement current injected by the first shield and the second shield into the secondary windings has a same amplitude and an opposite polarity of the displacement current injected by the primary windings into the secondary windings.

* * * * *